United States Patent [19]

Gourlandt

[11] Patent Number: 4,951,610

[45] Date of Patent: Aug. 28, 1990

[54] METHOD AND APPARATUS FOR AUTOMATICALLY DEBEAKING POULTRY, SUCH AS YOUNG CHICKS, YOUNG TURKEYS, YOUNG GUINEA FOWL, AND DUCKLINGS

[76] Inventor: Albert Gourlandt, Les Grésillons, 7895 0 Gambais, France

[21] Appl. No.: 185,096

[22] Filed: Apr. 22, 1988

[30] Foreign Application Priority Data

Apr. 23, 1987 [FR] France ............................... 87 05767

[51] Int. Cl.[5] ............................................ A01K 37/00

[52] U.S. Cl. ...................................... 119/97.1; 119/1; 604/115

[58] Field of Search .......................... 119/97 R, 96, 1; 604/77, 115; 128/303.14

[56] References Cited

U.S. PATENT DOCUMENTS

| | | | |
|---|---|---|---|
| 4,019,513 | 4/1977 | Kawiecki | 604/77 |
| 4,026,289 | 5/1977 | Hendrix | 604/77 |
| 4,375,814 | 3/1983 | Gourlandt | 119/97 R |
| 4,446,819 | 5/1984 | Gourlandt | 119/97 R |
| 4,681,565 | 7/1987 | Gourlandt | 604/115 |

FOREIGN PATENT DOCUMENTS

| | | | |
|---|---|---|---|
| 888886 | 2/1981 | U.S.S.R. | 119/97 R |
| 1287862 | 2/1987 | U.S.S.R. | 119/97 R |

*Primary Examiner*—John Weiss
*Attorney, Agent, or Firm*—Poms, Smith, Lande & Rose

[57] ABSTRACT

A method and apparatus for automatically debeaking poultry. The apparatus includes a debeaking assembly. In a first stage, the debeaking assembly, including a debeaking element, is brought into proximity of the beak of a bird having its head held or restrained. In a second stage, the debeaking element is displaced relative to the debeaking assembly to debeak the bird. The beak may be cut by an upward movement of the debeaking element. In another embodiment, debeaking occurs due to downward movement of the debeaking member which cuts like a simple guillotine. In still another embodiment, upper and lower debeaking elements come together to cut the bird's beak. Another embodiment of the debeaking element may be used to perforate the bird's beak in order to destroy the nerve in the beak. The bird's beak may be cauterized after it is debeaked.

20 Claims, 13 Drawing Sheets

METHOD AND APPARATUS FOR AUTOMATICALLY DEBEAKING POULTRY, SUCH AS YOUNG CHICKS, YOUNG TURKEYS, YOUNG GUINEA FOWL, AND DUCKLINGS

The present invention relates essentially to improvements to a method and to apparatus for automatically debeaking poultry, such as young chicks, young turkeys, young guinea fowl, and ducklings. More particularly, the present invention relates to a method and to apparatus for automatically debeaking poultry, said apparatus comprising a debeaking assembly which is activated in two successive stages, and in which, in one particular embodiment, the debeaking element comprises a cutting member acting as a guillotine, whereas in another particular embodiment, the debeaking element perforates the beak in order to destroy its nerve.

BACKGROUND OF THE INVENTION

In U.S. Pat. No. 3,964,481, the inventor of the present invention has already described an apparatus for injecting vaccine into a chick carried in the hand and making use of a hypodermic syringe.

Further, the present inventor has also invented a method and an apparatus for automatically restraining poultry, said method and apparatus being applied in a preferred embodiment thereof to debeaking said poultry. This prior invention by the present inventor is described in a patent specification published in France under the number FR-A-No. 2 464 700, in Europe under the number EP-A-No. 27064, and in the U.S.A. under the number 4,375,814 and its division 4,446,819.

In addition, the present inventor has also improved this basic invention and has filed corresponding patent applications including a European patent published under the number EP-No. 0 148 692 and U.S. Pat. No. 4,681,565.

The present invention consists in further additional improvements to these prior inventions of the present Applicant for the purposes of simplifying as much as possible the general design of the debeaking assembly, of reducing its number of moving parts, and of improving debeaking accuracy, while allowing various adjustments to be performed in order to adapt to demand.

The practice of cutting and cauterizing the beaks of poultry in order to minimize cannibalism is widespread in the growing poultry industry.

However, beaks must be cut extremely accurately and reliably over time in order to avoid wounding the bird and making it incapable of feeding itself, and also to avoid facilitating infection which nearly always leads to the death of the bird.

The present invention solves these new technical problems by providing a solution which greatly simplifies the structure and the operation of the debeaking assembly while increasing its accuracy and reliability over time, even after it has been operating for several hundreds or thousands of hours, while still enabling adjustments to be performed to facilitate numerous modifications on request while in operation, thereby increasing the versatility of the invention.

SUMMARY OF THE INVENTION

Thus, in a first aspect, the present invention provides a method of automatically debeaking poultry, the method comprising:

providing a frame with holding or restraining and/or supporting means for holding or restraining and/or supporting the head of a bird substantially immobile and for treating the bird held in this way, in particular for debeaking purposes; and providing a debeaking assembly in the vicinity of said holding or restraining and/or supporting means, said debeaking assembly comprising a debeaking element which is displaceable between a non-operative position and an operative position where the debeaking element is in a debeaking position against the beak;

the method including the improvement whereby debeaking is performed in two stages:

a first stage in which the debeaking assembly together with the debeaking element is brought into the proximity of the beak while the beak is in a waiting position; and a second stage during which the debeaking element is displaced relative to the debeaking assembly in order to perform debeaking, per se.

In a particular implementation, the second stage takes place substantially after the first stage.

In another particular implementation of the method according to the invention, the debeaking element comprises a guillotine-forming cutting member. In this case, in an advantageous implementation, the beak is cut by pulling the debeaking element upwardly to cut through the lower mandible first and then through the upper mandible.

Naturally, in a different implementation of the method in accordance with the invention, it is possible to cut the beak by moving the debeaking element downwardly.

According to yet another variant implementation of the method in accordance with the invention, the beak is perforated over the beak nerve in order to destroy the nerve.

According to a particularly advantageous characteristic of the method in accordance with the invention, the beak is cut or perforated at a predetermined adjustable distance from the nostril of the bird.

Advantageously, after debeaking by cutting or perforating the beak, the beak is cauterized at least once.

In accordance with an advantageous characteristic of the method according to the invention, at least a portion of the above-mentioned holding or restraining and/or supporting means is displaceable around a closed circuit, with a plurality of holding and/or support means being provided spaced apart along said closed circuit, and with the above-mentioned debeaking assembly being disposed in the vicinity of said closed circuit such that each holding or restraining and/or supporting means is caused to pass initially through a loading station, then through a debeaking station, and finally through an unloading station.

In a second aspect, the present invention also provides an apparatus for automatically debeaking poultry, the apparatus comprising:

a frame;

holding or restraining and/or supporting means for holding or restraining and/or supporting the head of a bird substantially immobile and for treating the held bird, particularly for debeaking purposes;

a debeaking assembly in the vicinity of said holding or restraining and/or supporting means, comprising a debeaking element which is displaceable between a non-operative position and an operative position where the debeaking element is in a debeaking position against the beak; and actuator means for displacing the debeaking assembly into its operative position, and thereafter returning the debeaking assembly to its non-operative position;

said apparatus including the improvement whereby said actuator means comprise first actuator means for bringing the debeaking assembly together with the debeaking element into the proximity of the beak in a waiting position; and second actuator means for displacing the debeaking element relative to the debeaking assembly in order to perform debeaking, per se.

In accordance with a particular characteristic of the apparatus according to the invention, the second activator means are activated substantially after the first activator means.

In a particular embodiment, the debeaking assembly comprises a support element mounted to pivot relative to a support structure which is displaceable in rotation but whose axial position is fixed; said support element being actuated by said first actuator means; the debeaking element being actuated by said second actuator means so as to perform debeaking by axial displacement of the debeaking element relative to the support structure.

In a particular embodiment, said debeaking element comprises a guillotine-forming cutting member or a member for perforating the beak over the nerve in order to destroy the nerve, e.g. a drill bit system, a laser system, or an electric arc system.

In a particular embodiment, the support element includes a through orifice, and the cutting member also includes a through orifice which, in the rest position of the cutting member, coincides with the orifice through the support element such that the bird's beak is inserted simultaneously into the orifice in the support element and into the orifice in the cutting member when the debeaking element is brought to the proximity of the beak while the beak is in the waiting position.

In a particular variant embodiment, the beak is cut by pulling the cutting member upwardly.

In another particular embodiment of the invention, the apparatus includes means for adjusting the position of the debeaking element to a predetermined adjustable distance from the holding or restraining means in order to cut or perforate the beak at a predetermined distance from the nostril of the bird.

In another particular embodiment of the apparatus in accordance with the invention, the holding or restraining and/or support means comprise a front piece constituting at least a portion of a cap having a hollow for receiving at least a portion of the head of a bird, said hollow including an opening of just sufficient width to pass the beak of the bird so that at least a portion thereof is accessible from outside the front piece for debeaking purposes, said front piece being pivotally mounted relative to its support, preferably about a pivot axis which is disposed horizontally and is situated on the same side of the front piece that includes the beak-passing opening, but beyond the plane of the opening.

Naturally, it is also possible to provide for at least one portion of the holding or restraining and/or supporting means to be mounted to move around a closed circuit, a plurality of said holding or restraining and/or supporting means being provided spaced apart along said closed circuit, the debeaking assembly being disposed in the vicinity of said closed circuit such that each holding or restraining and/or supporting means is caused to pass initially through a loading station, then through a debeaking station, and finally through an unloading station, with a support which is mobile relative to a support structure being mounted so as to move from a non-operative position to an operating position and vice versa, the debeaking assembly being at least partially linked to the mobile support so as to move therewith.

In this case, in the apparatus according to the invention, the first actuator means comprise a first cam fixed to the moving support and first cam follower means linked to a support element for the debeaking element; and the second actuator means comprise a second cam fixed to the support structure of the mobile support and of the support element, and second cam follower means suitable for ensuring axial displacement of the debeaking element relative to the support structure.

In accordance with another advantageous characteristic of the invention, said front piece includes at least one inclined slope or ramp on its face facing the debeaking element and serving to accurately adjust the distance from the nostril of the beak at which the beak is cut or perforated.

It can thus be understood that the method and apparatus of the invention provide a simplified structure providing all of the above-specified technical advantages.

However, other objects, characteristics and advantages of the invention appear clearly to the person skilled in the art from the following explanatory description given with reference to two currently preferred embodiments of the debeaking method and apparatus in accordance with the invention, which description is given purely by way of non-limiting example.

BRIEF DESCRIPTION OF THE DRAWINGS

Embodiments of the invention are described by way of example with reference to the accompanying drawings, in which:

FIG. 1 is a view similar to FIGS. 28 to 30 of U.S. Pat. No. 4,681,565);

DESCRIPTION OF PREFERRED EMBODIMENTS

Figure 1:
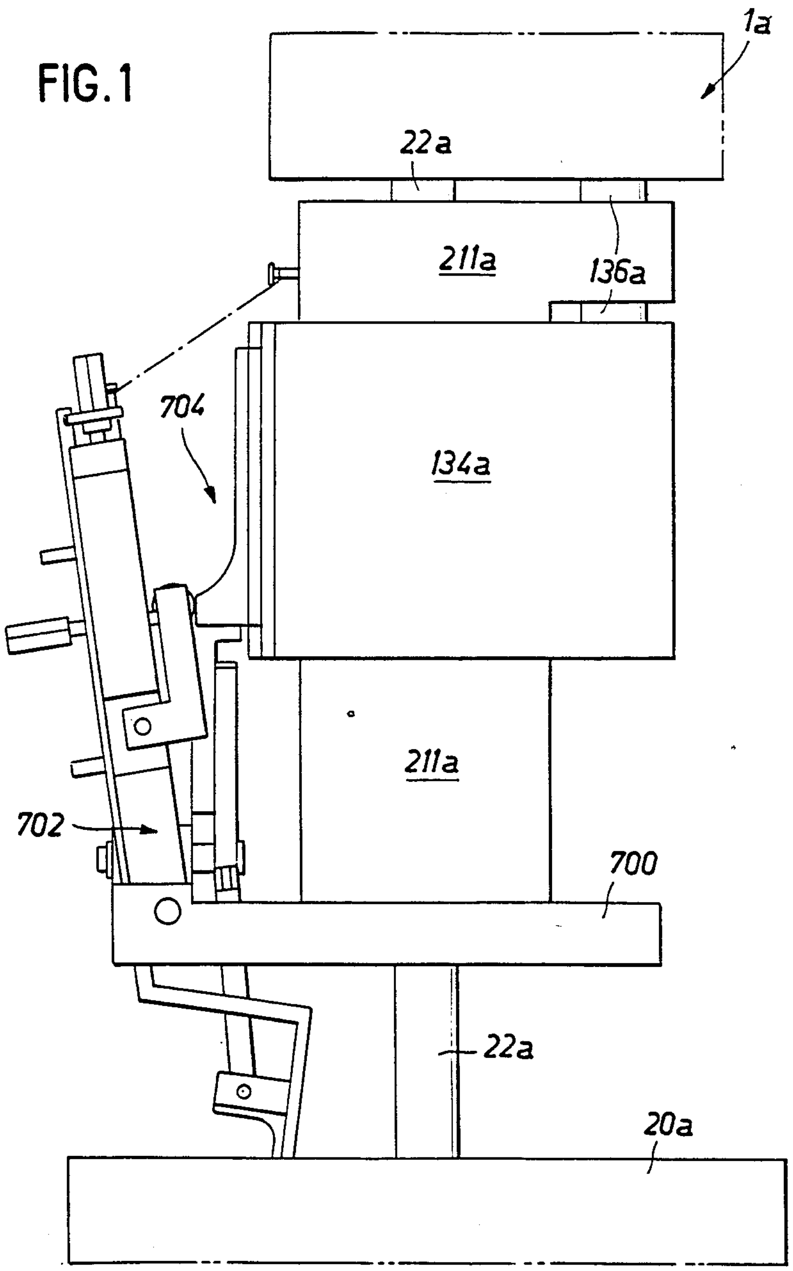
FIG. 1 is a diagrammatic side view of a debeaking station in apparatus for debeaking poultry in accordance with the invention, said apparatus constituting a modification of the basic apparatus described in the Applicant's prior U.S. Pat. Nos. 4,375,814 and 4,446,819 or 4,681,565 which are incorporated in this specification by reference (and in this respect

With reference to FIG. 1, the essential parts of the debeaking station of apparatus for automatically debeaking poultry are shown in accordance with a first embodiment of the invention, and in a manner similar to FIGS. 28 to 30 of U.S. Pat. No. 4,681,565, with the remainder of the apparatus being substantially the same as the basic apparatus described in U.S. Pat. No. 4,681,565.

Because of this, the entire description of U.S. Pat. No. 4,681,565 is incorporated fully herein by reference. Similarly, given that the description of U.S. Pat. No. 4,681,565 fully incorporates the contents of U.S. Pat. No. 4,375,814 and its division U.S. Pat. No. 4,446,819, the description of U.S. Pat. No. 4,375,814 and its division U.S. Pat. No. 4,446,819 is also fully incorporated herein by reference.

In order to obtain a better understanding of the present modifications over the apparatus described in said prior documents, FIG. 1 uses the same reference numerals for parts performing the same functions, with the numerals being modified by adding the letter a. New reference numerals begin at 700.

Thus, in accompanying FIG. 1, the apparatus is given an overall reference numeral 1a. The spindle 22 now has reference 22a, and the turntable 20 is now turntable reference 20a.

Likewise, mobile support 134 described in the above-mentioned prior applications of the present Applicant is now referenced 134a. The mobile support 134a rotates together with an intermediate support structure referenced 211a since it performs a function similar to the plate 211 visible in FIGS. 11, 11a, 19, 20, 21, 25, 26, 28 to 30, 32, 35, 36, and 38 of U.S. Pat. No. 4,681,565.

In the present modification, said intermediate support structure 211a extends vertically downwardly so as to constitute a structure which is not only a support structure but which is also suitable for allowing the mobile support 134a to slide vertically.

Further, the bottom end of said intermediate support structure 211a is fixed to a part 700 which constitutes a further support structure for the debeaking assembly per se 702.

The mobile support 134a, like the mobile support 134 in U.S. Pat. No. 4,681,565, is mounted to slide freely about an actuating shaft 136a which is analogous to the actuating shaft 136 described with reference to FIGS. 11 and 11a in U.S. Pat. No. 4,681,565, (bottom of column 7 and top of column 8).

Figure 10:
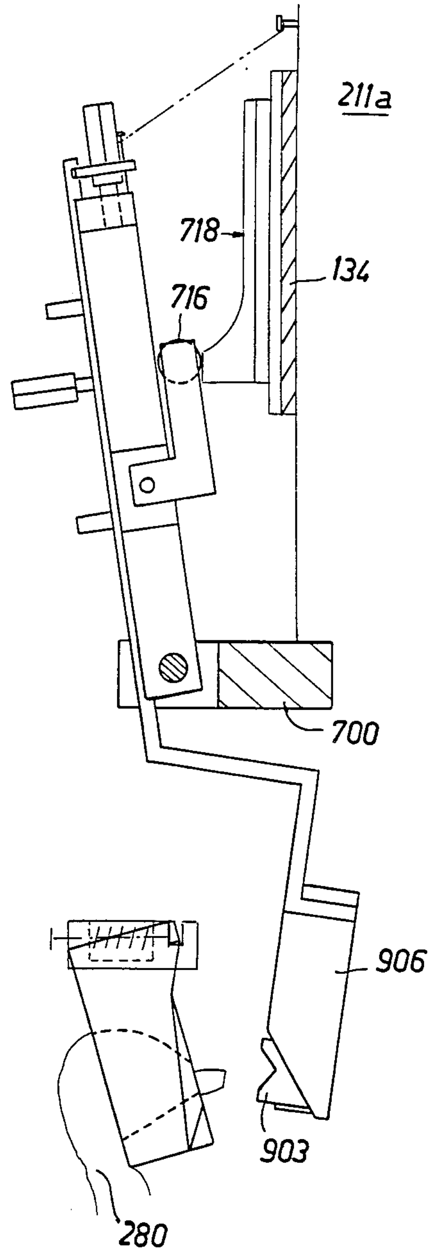
FIG. 10 is a diagrammatic side view in partial section of the cauterizing station and is similar to FIG. 25 of U.S. Pat. No. 4,681,565.

The actuating shaft 136a is naturally connected to actuator means 41 as described in U.S. Pat. No. 4,681,565, in particular with reference to FIGS. 10 and 11. The structure of these actuator means 41 is unchanged and reference may be made to U.S. Pat. No. 4,681,565.

Similarly, the turntable 20a has holding or restraining and/or supporting means 30a for holding and/or supporting the head of a bird substantially immobile and for treating the restrained bird particularly for debeaking. The means 30a are similar to the means 30 described in U.S. Pat. No. 4,681,565. More particularly, these means include a front piece 50a which is similar in function to the front piece 50 described in U.S. Pat. No. 4,681,565.

Figure 2A:
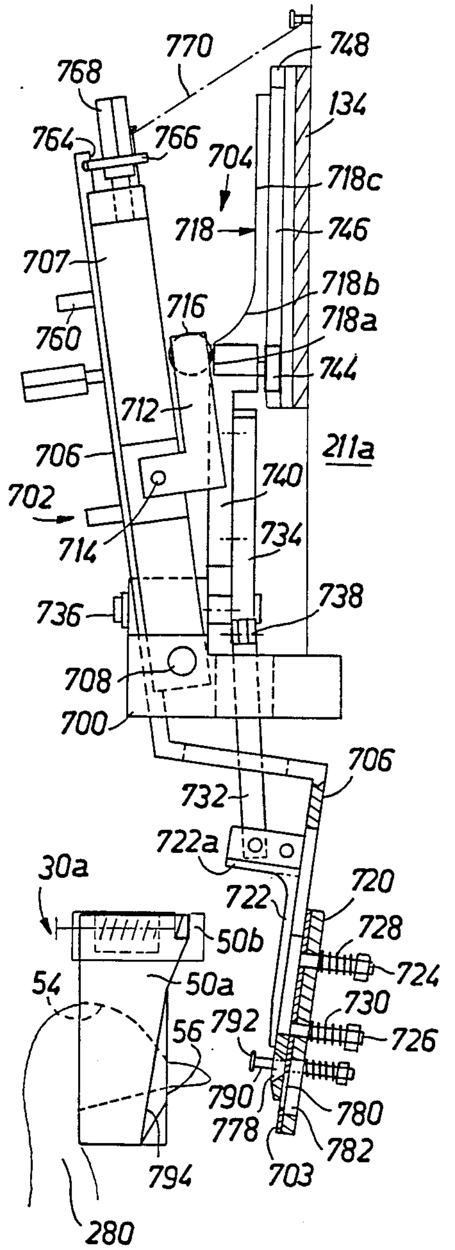
FIGS. 2*a* and 2*b* are fragmentary sections on a larger scale of the debeaking assembly in a non-operative starting position seen in side view (2*a*) and in front view (2*b*)
Figure 2B:
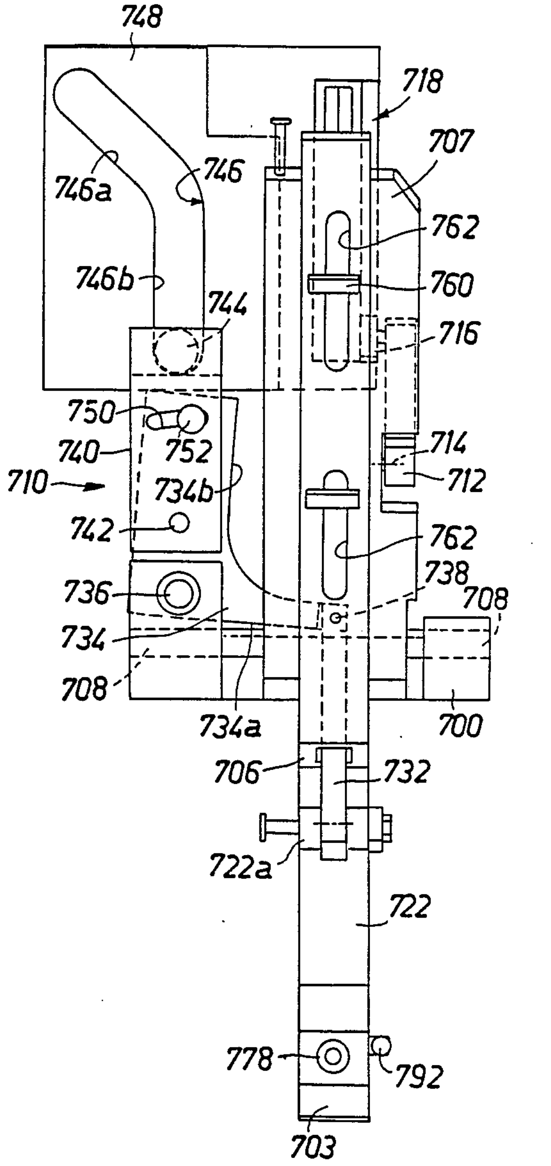
Figure 3A:
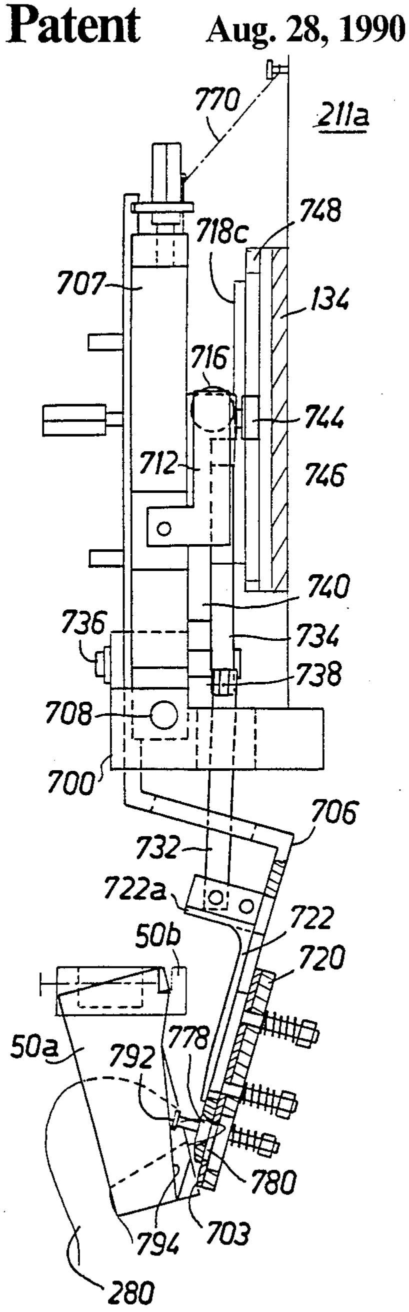
FIGS. 3*a* and 3*b* are similar views to FIGS. 2*a* and 2*b* in an intermediate position where the debeaking element is in the vicinity of a beak in position prior to debeaking, and are respectively a side view (3*a*) and a front view (3*b*)
Figure 3B:
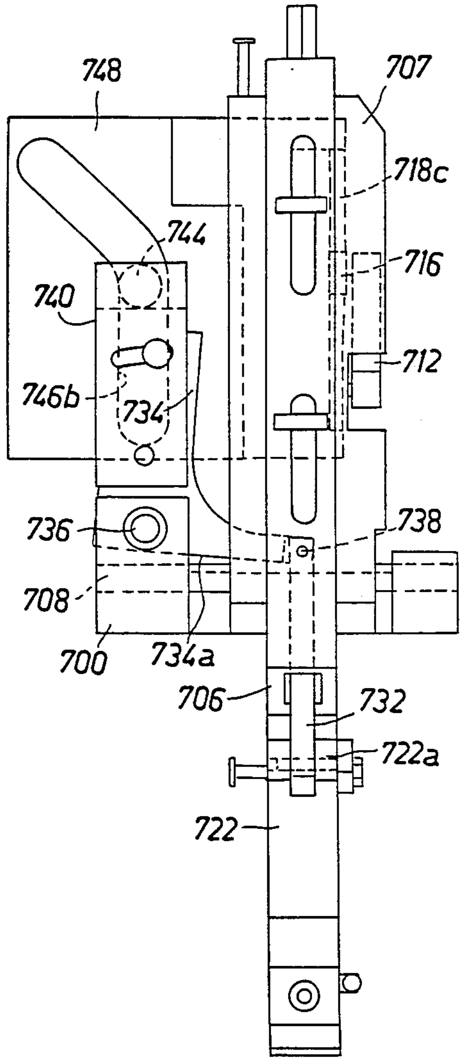
Figure 4A:
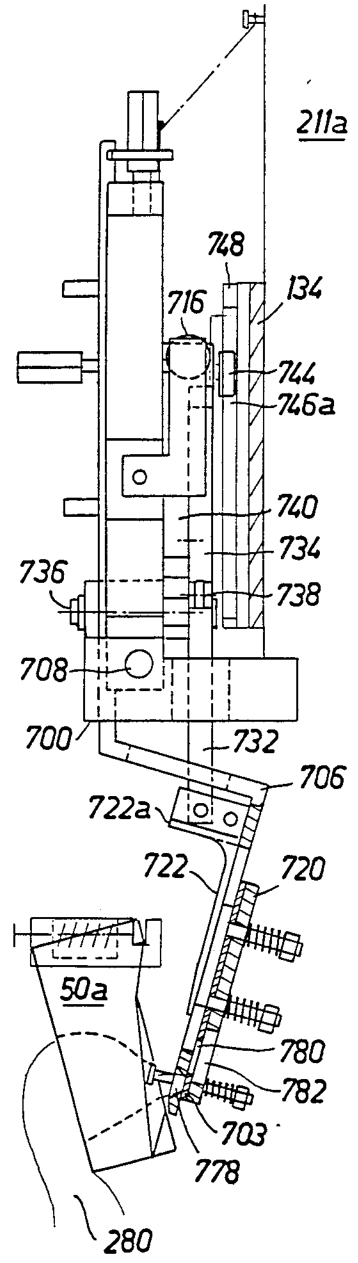
FIGS. 4*a* and 4*b* are views similar to FIGS. 2*a*, 2*b* and 3*a*, 3*b* in the debeaking position while debeaking is taking place, with the debeaking element being pulled upwardly in this case.
Figure 4B:
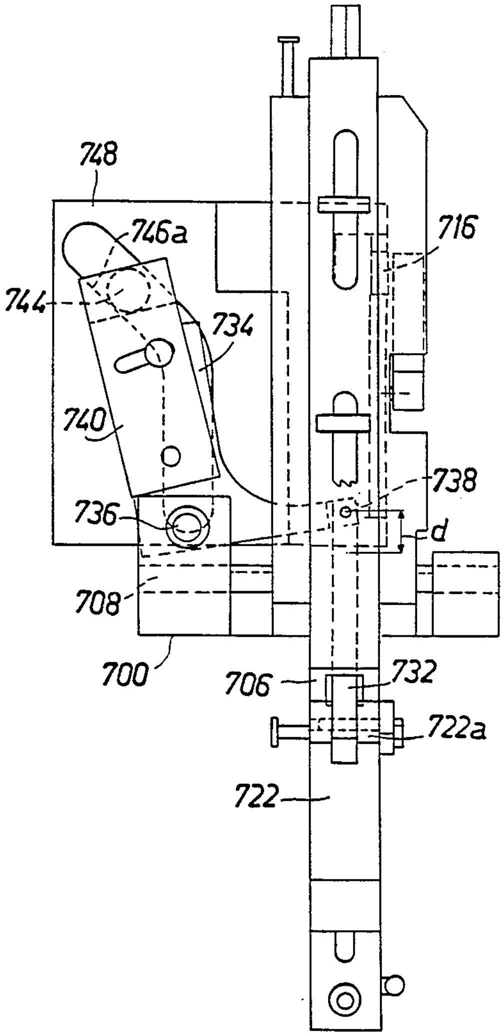

In accordance with the present invention, the poultry debeaking apparatus includes first actuator means 704 for the debeaking assembly 702 for bringing the debeaking assembly 702 together with the debeaking element per se 703 to the proximity of the beak of the bird 280 waiting in the debeaking position as shown in FIGS. 3a and 3b; together with second actuator means 710 which are clearly visible in the front views of FIGS. 2b, 3b, and 4b, serving to move the debeaking element 703 relative to the debeaking assembly, or more exactly relative to the support element 706 of the debeaking assembly 702.

Advantageously, the construction is such that the second actuator means 710 are activated substantially after the first actuator means 704.

In the first embodiment shown in FIGS. 1 to 5, the debeaking assembly comprises a support element 706 pivotally mounted relative to the support part 700 which is fixed to the support structure 211a about a hinge axis 708 which is advantageously disposed horizontally so that the support element 706 pivots in a vertical plane. In the embodiment shown, the support element 706 is removably mounted to an intermediate support member 707 in which a hinge pin 708 per se is disposed.

This support member 707 has first cam follower means 712 pivotally mounted thereon about a pivot axis or axis of rotation 714 which is axially offset upwards from the hinge axis 708. These first cam follower means 712 are provided, for example, with a wheel 716 which co-operates with first cam-forming means 718 of the first actuator means 704, which are fixed to the mobile support 134a.

It can thus be understood that co-operation between the cam follower means 712 and the cam-forming means 718 during downward and upwards movements of the mobile support 134*a* give rise to pivoting motion of the support element 706 in the vertical plane from its starting position shown in FIGS. 2*a* and 2*b* to the intermediate position shown in FIGS. 3*a* and 3*b*, because of the profile of the cam 718 which, going upwardly, begins with a bulge 718*a*, followed by a curve 718*b* and extended by a vertical portion 718*c*.

The debeaking element 703 is mounted to be axially displaceable relative to the support structure 700 and is activated by the second actuator means 710. The structure of the second actuator means is as follows.

In this case, the debeaking element 703 is initially held against the support element 706 while being free to slide relative thereto by means of bottom and top plates 720 and 722 which are fixed to each other by adjustable thrust pressure fixing means 724 and 726 in which the thrust pressure is adjusted by resilient means 728 and 730. In this case, the top plate 722 is linked to move with a transmission rod 732 which is pivotally mounted at one end relative to the top plate 722 on a shoulder 722*a* thereof, and at its other end to an intermediate control part 734 having an L-shaped profile and mounted to rotate about an axis of rotation 736 disposed substantially in the angle of the L-shape, whereas the transmission rod 732 is pivotally mounted about a hinge axis 738 to one end of the L-shaped part 734, and in this case its base 734*a*.

In addition, a part 740 is rotatably mounted on the bar 734*b* of the L-shaped part 734 in order to form the second follower means for the above-mentioned cam. This part 740 is rotatably mounted relative to the pert 734 about an axis of rotation 742. The end of the part 742 furthest from the axis of rotation 742 carries a wheel 744 which runs in a closed groove 746 made in a plate 748 fixed on the mobile support 134*a*. Further, in the intermediate portion between the wheel 744 and the hinge axis 742, towards the top and of the bar 734*b* of the L-shaped part 734, the part 740 includes a slot 750 through which fixing means 752 can pass to fix the part 740 to the control part 734, thereby enabling the relative position of the parts 740 and 734 to be adjusted so as to adjust the length of the active stroke of the transmission rod 732 and thus of the debeaking element 703 which is linked to move with said rod 732 when the wheel 744 is caused, towards the end of the downstroke of the mobile support 134*a*, to penetrate in that portion of the groove 746*a* which is inclined to the left, following a vertical portion 746*b* of said groove.

It may also be observed that the support element 706 is removably fixed to the support member 707 by one or more fixing means 760. In order to enable the vertical position or height of the support element 706 to be adjusted, the support element 706 includes one or more position-adjusting slots 762, while at its top end it includes a groove 764 which receives a blade 766 fixed to an adjusting screw 768 mounted on the top portion of the support member 707. Resilient return means 770 are also fixed firstly to the support structure 211*a* and secondly to the top portion of the support member 707 so as to permanently urge the wheel 716 against the cam-forming part 718 and also to urge the wheel 744 into the groove 746 which forms the second cam for the second actuator means.

Further, the debeaking element 703 comprises, in this case, a cutting member in the form of a plate provided with a through orifice 780 for receiving the beak of a bird. Naturally, the support element 706 also includes a through orifice 778 for receiving the beak of the bird, and this orifice is advantageously conical in profile with its large base towards the bird so as to facilitate beak insertion.

Similarly, the bottom plate 720 includes a through orifice 782 of larger size for receiving the beak and for removing it after it has been cut.

It may be observed that the orifice 780 through the cutting member which constitutes the debeaking element 703 in this case, coincides when in the rest position of said cutting member with the orifice 778 through the support element 706 such that the beak of the bird can be inserted simultaneously into the orifice 778 of the support element 706 and into the orifice 780 of the cutting member (and naturally also into the orifice 782 through the bottom plate 720), as shown in the intermediate position in FIGS. 3*a* and 3*b*.

In order to make it possible to adjust, at will, the position at which the beak is cut relative to the bird's nostrils, means 790 are provided for adjusting the position of the debeaking element 703 to a predetermined distance which is adjustable by the holding/restraining means 30*a*, i.e. by the front piece 50*a* in this case. These adjustment means 790 are constituted, for example, by a screw whose head 792 is provided to bear against a corresponding surface 794 of the front piece 50*a*.

In an advantageous embodiment, said corresponding surface 794 is in the form of an inclined flat forming an acute angle alpha of several degrees relative to the general plane of the face containing the plane of the opening 56.

Figure 5A:
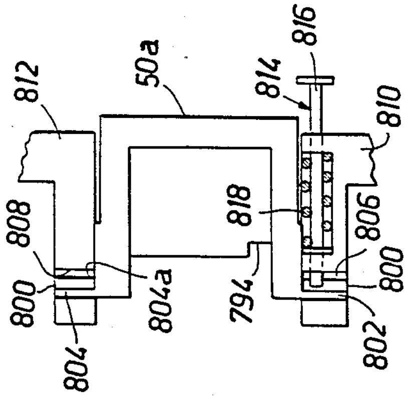
FIGS. 5, 5*a*, and 5*b* are respectively a diagrammatic fragmentary section view of the front piece constituting holding or restraining and/or supporting means for poultry, with FIG. 5 showing the piece on its own, FIG. 5*a* being a plan view in section showing how said front piece is pivotally mounted, and FIG. 5*b* showing the front piece in position for co-operating with the debeaking assembly when in the position shown in FIG. 3a (with FIG. 5b being on a larger scale than FIG. 3a)
Figure 5:
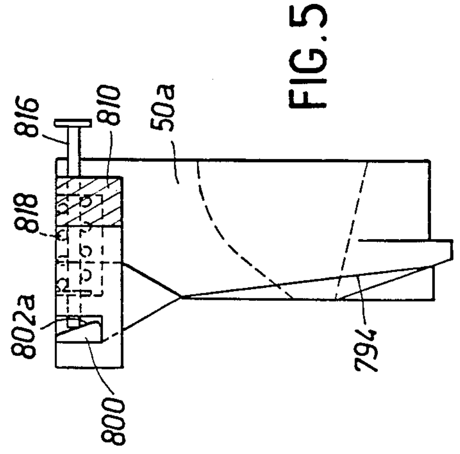
Figure 5B:
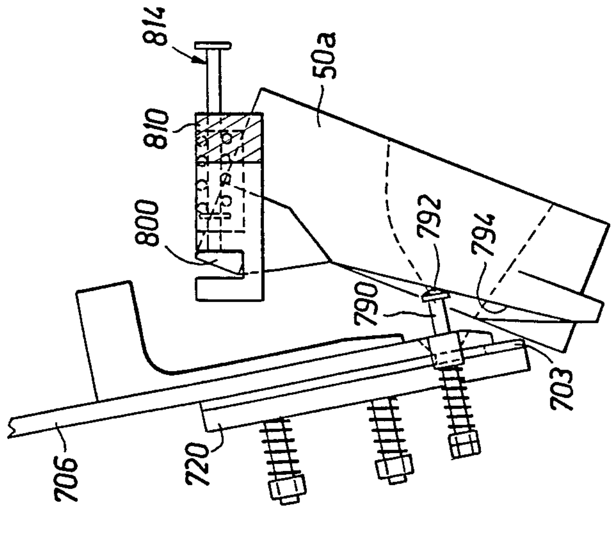

In a particularly preferred embodiment, the front piece 50*a* is pivotally mounted at its leading edge 50*b* facing the debeaking element 703 about a pivot axis which is disposed in a substantially horizontal plane and which is symbolized by reference 800 in FIGS. 5, 5*a*, and 5*b*. In practice, and with reference to FIGS. 5, 5*a*, and 5*b*, the front piece 50*a* comprises two outwardly projecting transverse shoulders 802 and 804 pivotally mounted in notches 806 and 808 provided in support bearings 810 and 812 integrally mounted on the turntable 20*a*. At least one of the bearings, for example the bearing 810, is provided with means 814 for permanently urging the front piece 50*a* into a vertical position by co-operation with a rod 816 which is permanently urged by resilient means 818 against an inclined surface 802*a*, 804*a* of the transverse projections 802, 804.

FIG. 5*b* shows the thrust position of the adjustment means 790 against the inclined slope 794 of the front piece 50*a*.

By virtue of this structure, it is possible to adjust at will the position at which the beak is cut from the nostril of the bird.

The operation of the above-described above is now described with reference to FIGS. 1 to 5, 5*a*, and 5*b*, which applies to a first embodiment of the debeaking assembly.

The mobile support 134*a* moves downwardly starting from a starting position shown in FIGS. 2*a* and 2*b* where the mobile support 134*a* is in its top position where the wheel 716 is resting against a projecting bottom portion 718*a* of the cam 718, and the wheel 744 is at the bottom edge of the vertical portion 746*b* of the groove 746. As the mobile support moves downward, the wheel 716 forming a part of the first actuator means 706 moves down the arcuate portion 718*b* of the cam 718, thereby pivoting the support element 706 about the pivot axis 708 so as to bring it to the intermediate position shown in FIGS. 3*a* and 3*b* where the debeaking element 703 is in the proximity of the beak in a position where it is waiting to be debeaked. In this first stage or step, the debeaking element is not actuated since the wheel 744 of the second actuator means is moving along the vertical portion **746*b* of the groove 746**.

However, thereafter, as the mobile support **134*a* continues to move downward, the wheel 744 is made to penetrate into the sloping portion 746*a* of the groove 746, thereby causing the parts 740 and 734 which are fixed together by the fixing means 752 to pivot, such that the transmission rod 732 moves substantially linearly through a distance d which is clearly shown in FIG. 4*b*. This naturally gives rise to a linear displacement through the same distance d of the debeaking element 703** constituted by a guillotine-forming cutting member.

It may be observed, in this first embodiment, that the design of the structure is such that the beak is cut by performing an upward pulling movement on the guillotine-forming debeaking element 703, thereby cutting the lower mandible before the upper mandible.

In addition, the relative positions of the support element 706 and thus of the debeaking element 703, and the inclined slope 794 of the front piece **50*a*** are provided in such a manner as to ensure that the line of cut runs perpendicularly to the bird's beak.

It can be seen that this gives rise to a debeaking assembly of particularly simple design, with numerous possibilities for adjusting the cutting distance by adjustment means 790 for adjusting the path of the guillotine-forming cutting member constituting the debeaking element 703 with the fixing means 752 cooperating with the slot 750.

A second embodiment of a debeaking assembly in accordance with the invention is shown in FIGS. ***6a*, *6b*, *7a*, *7b*, and *8a*, *8b*, and in this embodiment the debeaking element, now referenced 803, is constituted by a cutting member forming a simple guillotine, i.e. the beak is cut during the downstroke of the support element 806. In this second embodiment, the first actuator means are essentially identical to those of the first embodiment shown in FIGS. 1 to 5. The essential difference lies in the fact that the support element 806 of the debeaking element 803 is fixed to an intermediate slide 900 by fixing means 860, said slide 900 being slidably mounted in a corresponding housing of the support member 807 which includes an L-shaped part 812 pivoting about an axis of rotation 814, and supporting a wheel 816 which co-operates with the first cam-forming means 818. All of these means are similar to those described for the first embodiment of FIGS. 1 to 5, and for this reason they have the same reference numerals plus 100**.

In this second embodiment, the slide 900 is actuated in translation by being fixed to one end of the base of an intermediate control part 834 analogous to the intermediate control part 734 of the first embodiment shown in FIGS. 1 to 5. This intermediate control part 834 is thus rotatably mounted about an axis of rotation 836.

However, the other end **834*b* of said intermediate control part 834 is simpler and carries a wheel 844 which co-operates with a cam 846 that initially comprises a vertical profile 846*a* followed by a curved profile 846*b* and terminating by a flat 846*c*. Since the axis of rotation 836 of the intermediate control part 834 is disposed perpendicularly to the axis of rotation 808 of the support bar 807, it is clear that the cam 846 is situated in a plane which is perpendicular to the plane of the cam 818**, as in the first embodiment.

It can be seen that in this second embodiment the debeaking element 803 is simplified by constituting a simple guillotine which cuts the beak on the vertical downstroke, and that the design of the structure for the intermediate control part 834 is also simplified, but that a structure as shown in FIG. 1 using an additional part 740 could be adapted to this embodiment in order to provide even more accurate adjustment.

This second embodiment operates very simply as follows. Starting from the starting position shown in FIGS. *6a* and *6b* and in which the mobile support **134*a* is in its high position (which is a non-operative position) the moving support 134*a* begins to move down under the action of the actuator means 41 described in U.S. Pat. No. 4,375,814 and its division U.S. Pat. No. 4,446,819 or in U.S. Pat. No. 4,681,565, with the wheel 816 immediately following the curved portion 818*b* of the cam 818, thereby pivoting the assembly constituted by the support member 807, the slide 900, the support element 806, and the debeaking element 803 which in this case constitutes a cutting blade fixed to the support element 806, such that the debeaking element 803 becomes situated immediately above the beak in the waiting position since the wheel 844 follows the vertical profile 846*c* of the cam 846 as can clearly be seen in FIGS. *7a* and *7b*. The slide 900** has therefore not moved.

However, as the mobile support **134*a* continues to move down, as shown in FIGS. *8a* and *8b*, the wheel 844 follows the curved profile 846*b*, thereby causing the slide 900 to slide relative to the support bar 807 by virtue of the intermediate control part 834 pivoting about its pivot axis 836, through a distance d clearly shown in FIG. *8b***.

This sliding movement of the slide 900 is made possible by virtue of a slot 902 in the slide which cooperates with the hinge axis 838 formed, in this case, merely by a finger fixed to the base **834*a* of the part 834**.

However, because of the following vertical profile of the cam 818, the support element 806 and the debeaking element 803 which is fixed thereto remain in the same vertical plane.

Thus, debeaking likewise takes place in this case in two successive stages as in the first embodiment.

Figure 6A:
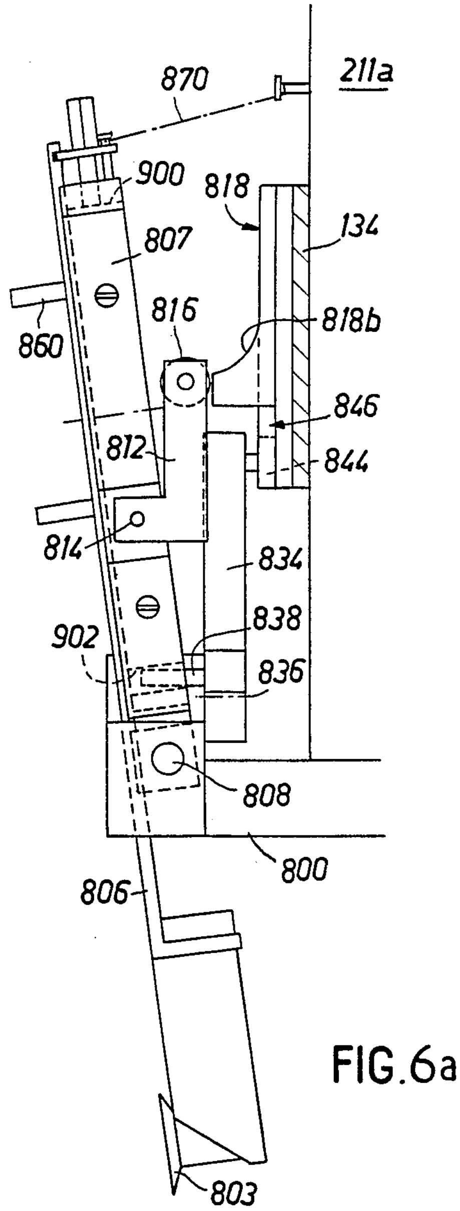
FIGS. 6a and 6b show a second embodiment of debeaking apparatus in accordance with the invention comprising a debeaking assembly whose debeaking element is a simple guillotine, the apparatus is shown in the non-operative position with FIG. 6a being a side view and FIG. 6b being a front view.
Figure 6B:
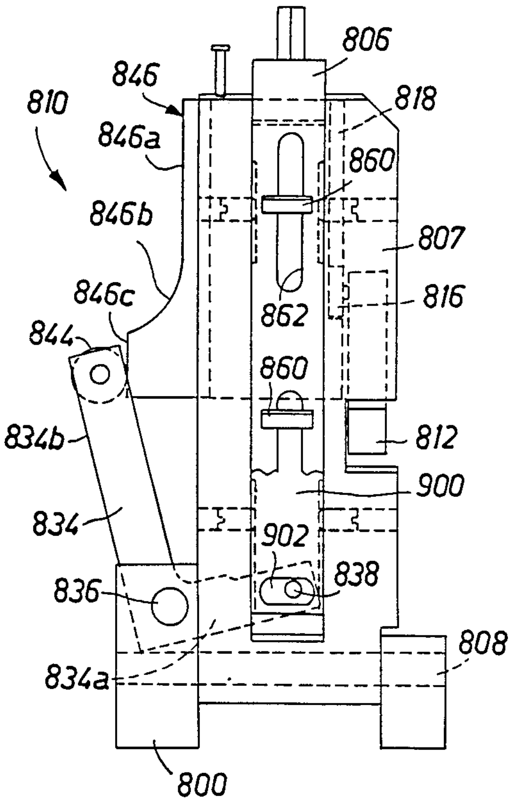
Figure 7A:
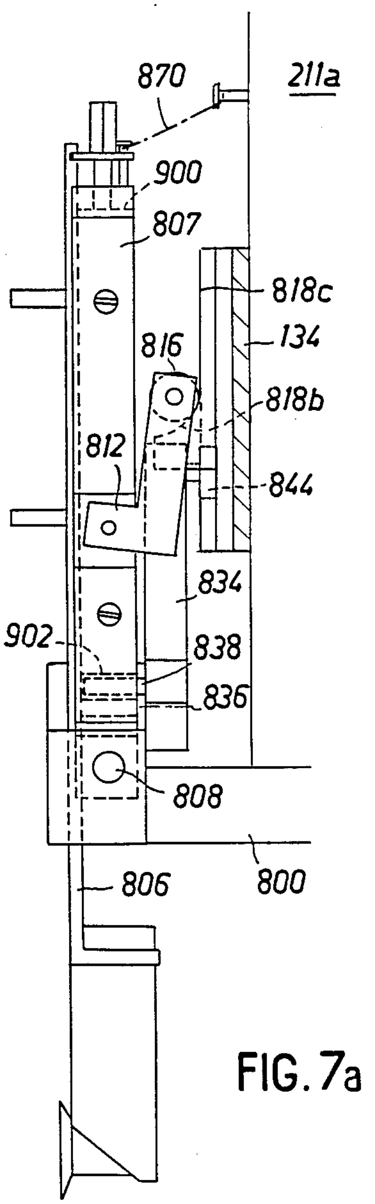
FIGS. 7a and 7b are intermediate views similar to FIGS. 3a and 3b.
Figure 7B:
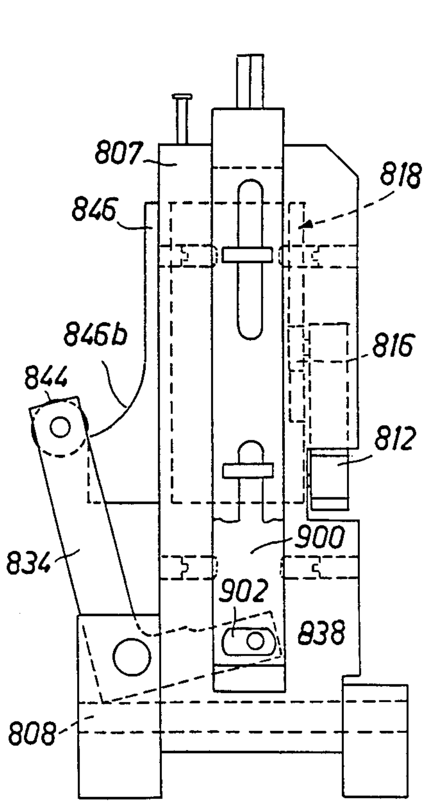
Figure 8A:
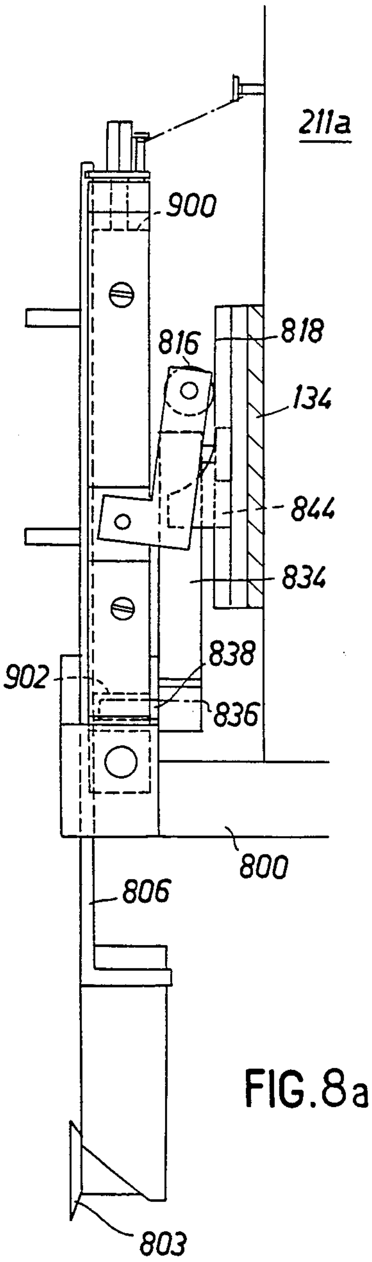
FIGS. 8a and 8b are views similar to FIGS. 4a and 4b showing the apparatus in the operative position during debeaking.
Figure 8B:
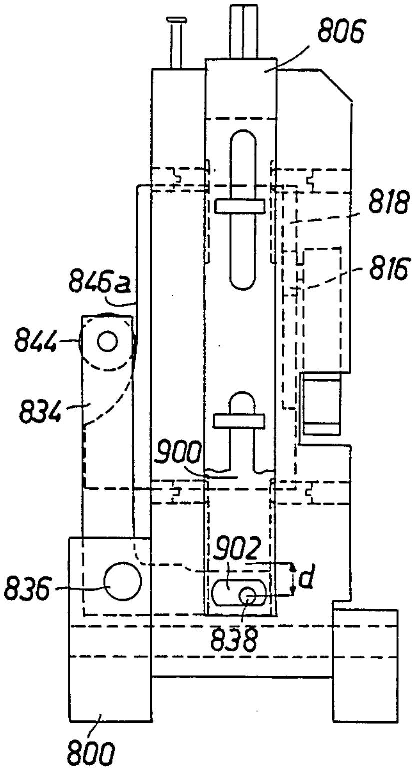
Figure 9:
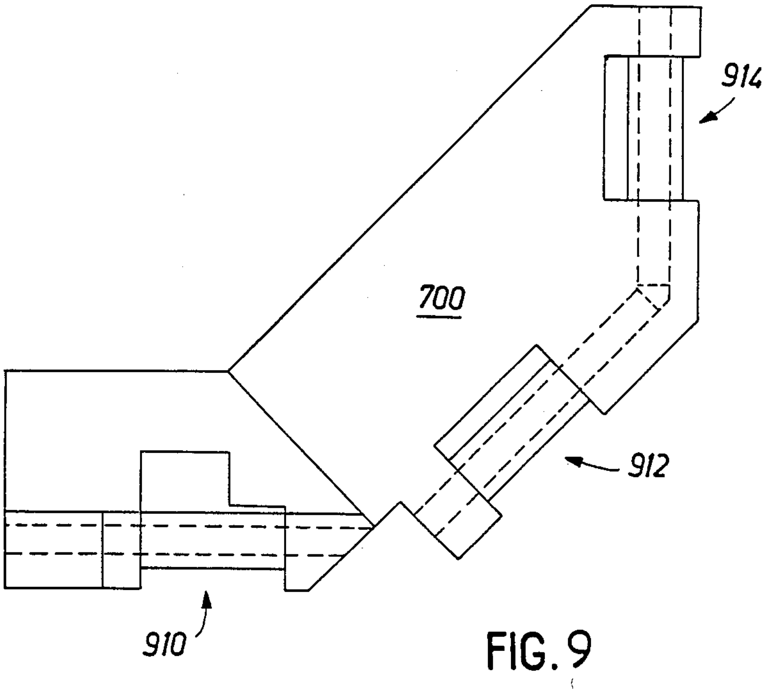
FIG. 9 is a diagrammatic plan view of various stations showing a cauterizing station after the debeaking station, said view being similar to FIGS. 22 or 31 or 34 of U.S. Pat. No. 4,681,565.
Figure 11:
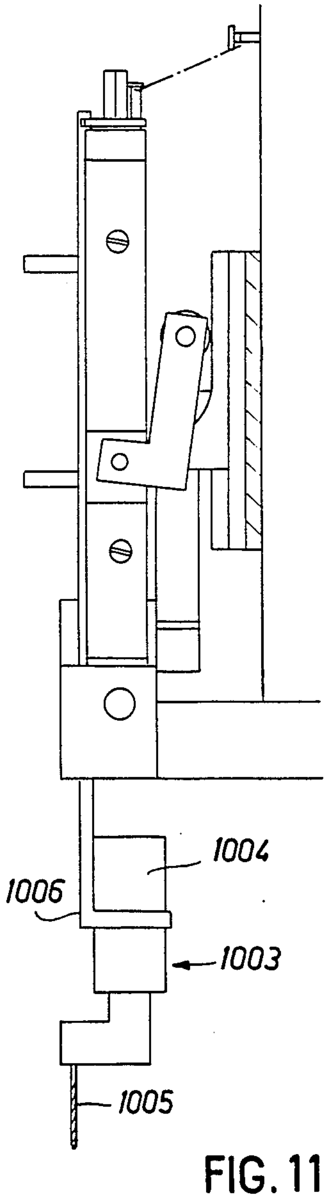
FIG. 11 shows a third embodiment of the debeaking element.

FIG. 9 is a diagrammatic plan view of the base 700 of the support structure **211*a* and serves to show the debeaking station 910 which may be provided with a debeaking assembly as shown in FIGS. 1 to 5 or as shown in FIGS. 6 to 8 or as shown in FIG. 11** which is described below.

After the debeaking station, there is at least one cauterizing station (and preferably two cauterizing stations given reference numerals 912 and 914). The cauterizing stations may as described in U.S. Pat. No. 4,681,565, with reference to FIGS. 34 to 36, or by the cauterizing assembly shown in FIG. 10 of the present specification. This structure only requires a simple pivoting motion of a cauterizing element 903 in order to bring it against the bird's beak to be cauterized, and it is therefore substantially identical to the basic structure of both the first and second embodiments shown in FIGS. 1 to 8, except insofar as all of the components provided for the purpose of effectuating relative displacement between the support element 906 and the cauterizing element 903 have been omitted. In other words, the support element 906 is a single piece and is fixed directly to the support member 907 as in the first embodiment shown in FIGS. 2 to 5. Its position is likewise adjustable in height by virtue of adjusting means 968. The cauterizing element 903 is conical in profile and is heated by any suitable means to a temperature which is high enough to cauterize the beak.

With reference to FIG. 11, a third embodiment of the debeaking element is shown which constitutes a variant of the debeaking assembly shown in FIGS. 6 to 8. In this case, instead of using a single cutting blade as the debeaking element, a member is used for perforating the beak over its nerve in order to destroy the nerve. It may be constituted by drill means referenced 1003 fixed to a support element 1006 having the same structure as the support element 806 and integrated in the same structure as in the second embodiment shown in FIGS. 6 to 8. This drill conventionally includes a motor 1004 for actuating a drill bit 1005.

Thus, in the first stage, the drill bit is brought to a position immediately above the bird's beak, i.e. to the intermediate position shown in FIGS. 7a and 7b, after which continued descent of the mobile support 134a while the motor is switched on to rotate the drill bit causes the beak to be drilled down to its nerve. The destruction of the beak nerve will cause the beak subsequently to fall off, thereby giving rise to debeaking using an operating principle identical to that for the first two embodiments. Naturally, the drill bit system could be replaced by a laser system or by an electric arc system. After perforation, it is advantageous to proceed with at least one cauterization which may be performed by a cauterization member in the form of a bit raised to the cauterization temperature. In this case, cauterization also takes place in two stages, a stage during which the cauterization member is brought into the proximity of the beak, and a cauterization stage, per se, where it passes into the perforation in order to cauterize it.

In FIGS. 12 to 15, a fourth invention embodiment is shown relating to a double debeaking system using an upper debeaking element 1103a, for instance constituted by an upper hot blade, a lower debeaking element 1103b, for instance constituted by a lower hot blade, which come in debeaking position (FIG. 13) respectively in contact with the upper beak and the lower beak of the bird.

Each debeaking element 1103a, 1103b is independently mounted on a support member 1106a, 1106b removably fixed on slide members 1107a, 1107b which are slidably mounted on ball bearings in an intermediary support 1108 rotatively mounted on a rotation pivot axis 1108a horizontally disposed in part 700 to which is fixed the intermediate support structure 211a described in FIG. 1.

The slide members 1107a, 1107b are linked to a rack member 1150a, 1150b provided with a rack 1200a, 1200b, respectively.

Figure 15:
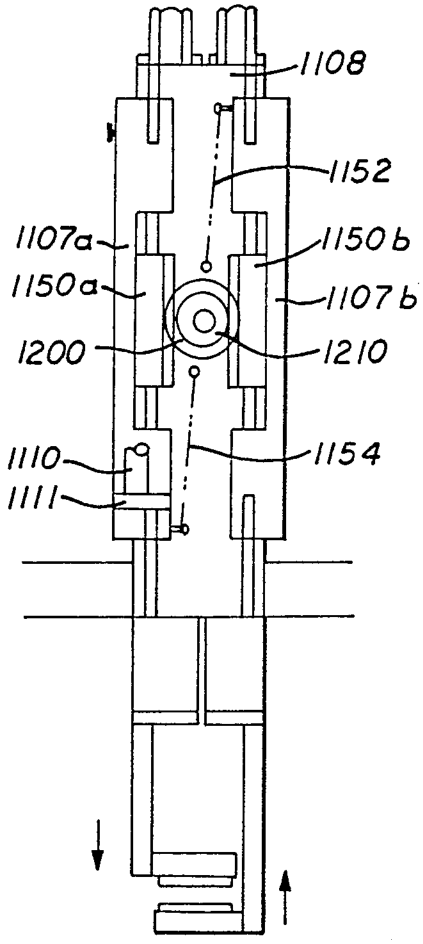
FIG. 15 is a rear view of the embodiment of FIG. 12 allowing to show the rack-and-pinion gear mechanism ordering movement in opposite directions of the upper and lower debeaking elements.

Rack 1200a of rack member 1150a is gearing into a pinion gear 1210 in diametric opposed position with respect to rack 1200b of rack member 1150b gearing into same pinion gear 1210, as clearly shown and understandable in FIG. 15. With such a structure, the upper and lower debeaking elements are movable in opposite directions as shown by the arrows in FIGS. 14, 15.

Figure 12:
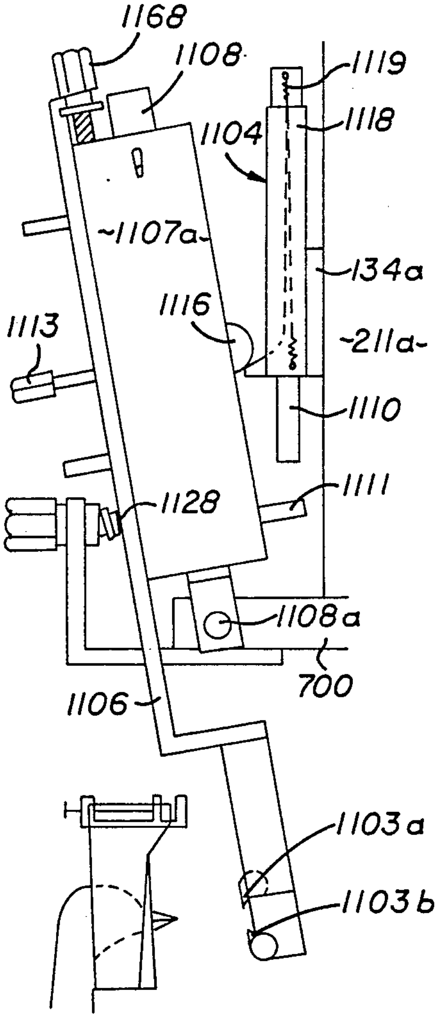
FIG. 12 shows a fourth embodiment of the debeaking element comprising an upper debeaking element and a lower debeaking element, according to a side view, said debeaking element being out of working (rest position)
Figure 13:
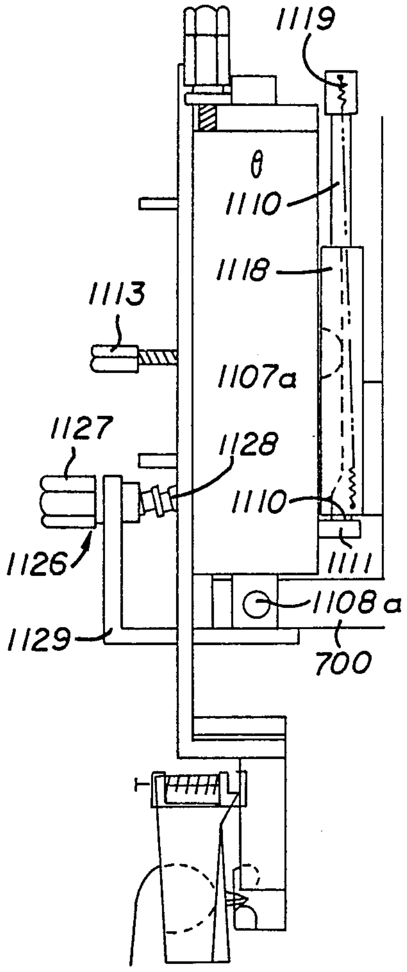
FIG. 13 is a side view like FIG. 12 with the debeaking element in working position.
Figure 14:
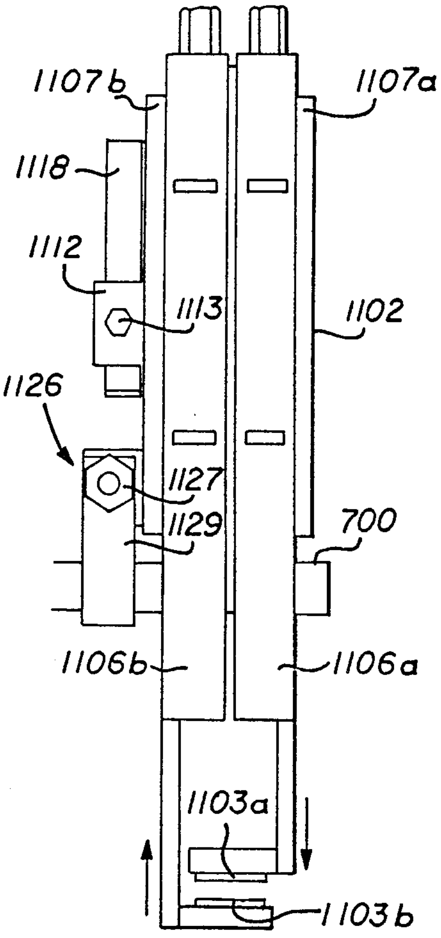
FIG. 14 is a front view of the embodiment of FIG. 12 with arrows showing the movement of each upper and lower debeaking elements.

On the slide member 1107b is mounted laterally a cam follower means 1112 bearing a wheel 1116 seen on FIGS. 12, 13 rolling on a cam means 1118 fixed on mobile support 134a, like cam means 718.

This cam means 1118 has an axially disposed through bore in which is slidably located a second actuator means 1110, here a finger, which is aimed to come against a plate means 1111 fixed on slide member 1107a, to cause pivotment of slide members 1107a, 1107b around pivot axis 1108a from the rear, non-working position of FIG. 12, to the front, working position of FIG. 13.

The stroke of the finger-actuator means 1110 is given by mounting this finger with a spring 1119 within the through bore of cam means 1118, said spring 1119 being biased when the slide member 1107a has been put in the vertical position of FIG. 13, as clearly understandable for one skilled in the art.

A further setting of the pressure applied by the debeaking elements 1103a, 1103b on the upper and lower beaks is given by the pressure setting means 1126 comprising a screw 1127 and a spring 1128 which is more or less acting against the support member 1106a on rotation of slide members 1107a, 1107b with intermediary support 1108 around axis 1108a. Screw 1127 is mounted on a supporting plate 1129 fixed on support part 700.

The working of the debeaking is as follows: when the mobile support 134a lowers, cam means 1118 lowers with it so that the slide members 1107a, 1107b and the support members 1106a, 1106b are pivoted vertically into a vertical position where finger 1110 comes into contact with plate 1111.

On continued lowering of mobile support 134a, finger 1110 pushes plate 1111 and lowers slide member 1107a linked with rack means 1150a, which gears with pinion gear 1200, thereby causing a reverse movement of the opposite rack means 1150b with slide member 1107b. These opposite movements cause same opposite movements of the support members 1106a, 1106b as shown by the arrows on FIGS. 14, 15.

The initial, non-working position of the debeaking elements 1103a, 1103b (where they are spaced apart one another) is obtained by return springs 1152, 1154 fixed respectively at one end on slide member 1107b or 1107a and at the other end on intermediary support 1108.

The debeaking position, by end of lowered stroke of finger 1110, is shown on FIG. 13. For one skilled in the art, other details of working are clearly apparent.

It will readily be understood that the invention can be implemented in numerous different ways without going beyond the scope thereof. The invention thus extends to any means constituting technical equivalents of the means described and to various combinations thereof. In addition, it should be observed that the entire cauterization structure, the debeaking assemblies, and the front piece described and shown, form an integral pert of the invention. Thus, the holding and/or restraining and/or supporting means (30a) may be a fixed structure or it may be mounted to move around a closed circuit as shown in the drawings, thereby providing a particularly advantageous embodiment.

I claim:

1. In a method of automatically debeaking poultry comprising the steps of:
   - providing a frame with holding and restraining means for holding and restraining a head of a bird substantially immobile and for treating the bird held in this way, in particular for debeaking purposes; and
   - providing a debeaking assembly in the vicinity of said holding and restraining means, said debeaking assembly including a debeaking element which is displaceable between a non-operative position and an operative position so that the debeaking element is in a debeaking position against the beak;

the improvement which comprises performing debeaking in two stages:

a first stage of bringing the debeaking assembly including the debeaking element into proximity with the beak while the beak is in a waiting position; and a second stage of displacing the debeaking element relative to the debeaking assembly in order to perform debeaking.

2. A method according to claim 1, wherein the second stage takes place substantially after the first stage.

3. A method according to claim 1 wherein the steps of displacing the beaking element to perform debeaking including cutting the beak at a predetermined adjustable distance from a nostril of the bird.

4. A method according to claim 1, wherein a plurality of the holding and restraining means are displaceable around a closed circuit and are spaced apart along said closed circuit, the debeaking assembly being disposed near said closed circuit such that each holding and restraining means is caused to pass initially through a loading station, then through a debeaking station, and finally through an unloading station.

5. In a method of automatically debeaking poultry comprising the steps of:

providing a frame with holding and restraining means for holding and restraining a head of a bird substantially immobile and for treating the bird held in this way, in particular for debeaking purposes; and providing a debeaking assembly in the vicinity of said holding and restraining means, said debeaking assembly including a debeaking element which is displaceable between a non-operative position and an operative position so that the debeaking element is in a debeaking position against the beak;

the improvement which comprises performing debeaking in two stages:

a first stage of bringing the debeaking assembly including the debeaking element into proximity with the beak while the beak is in a waiting position; and a second state of displacing the debeaking element relative to the debeaking assembly in order to perform debeaking, the debeaking element comprising a guillotine-forming cutting member for cutting the beak, displacing of the debeaking element being performed by pulling the debeaking element upwards in order to cut through a lower mandible and then through an upper mandible of the beak.

6. In a method of automatically debeaking poultry comprising the steps of:

providing a frame with holding and restraining means for holding and restraining a head of a bird substantially immobile and for treating the bird held in this way, in particular for debeaking purposes; and providing a debeaking assembly in the vicinity of said holding and restraining means, said debeaking assembly including a debeaking element which is displaceable between a non-operative position and an operative position so that the debeaking element is in a debeaking position against the beak;

the improvement which comprises performing debeaking in two stages:

a first stage of bringing the debeaking assembly including the debeaking element into proximity with the beak while the beak is in a waiting position; and a second stage of perforating the beak over a beak nerve thereof in order to destroy the nerve.

7. In an apparatus for automatically debeaking poultry comprising:

a frame;

holding and restraining means for holding and restraining the head of a bird substantially immobile and for treating the held bird, particularly for debeaking purposes;

a debeaking assembly in the vicinity of the holding and restraining means including a debeaking element which is displaceable between a non-operative position and an operative position so that the debeaking element is in a debeaking position against the beak; and actuator means for displacing the debeaking assembly into the operative position, and thereafter returning the debeaking assembly to the non-operative position;

the improvement which comprises the means including first actuator means for bringing the debeaking assembly including the debeaking element into proximity with the beak while the beak is in a waiting position; and second actuator means for displacing the debeaking element relative to the debeaking assembly in order to perform debeaking.

8. Apparatus according to claim 7, wherein the second actuator means are actuated substantially after the first actuator means; and the debeaking assembly comprises a support element mounted to pivot relative to a support structure which is displaceable in rotation but whose axial position is fixed; the support element being actuated by said first actuator means; the debeaking element being actuated by said second actuator means so as to perform debeaking by axial displacement of the debeaking element relative to the support structure.

9. In an apparatus for automatically debeaking poultry comprising:

a frame;

holding and restraining means for holding and restraining the head of a bird substantially immobile and for treating the held bird, particularly for debeaking purposes;

a debeaking assembly in the vicinity of the holding and restraining means including a debeaking element which is displaceable between a non-operative position and an operative position so that the debeaking element is in a debeaking position against the beak; and actuator means for displacing the debeaking assembly into the operative position, and thereafter returning the debeaking assembly to the non-operative position;

the improvement which comprises the actuator means including first actuator means for bringing the debeaking assembly including the debeaking element into proximity with the beak while the beak is in a waiting position; and second actuator means for displacing the debeaking element relative to the debeaking assembly in order to perform debeaking;

the debeaking element including a guillotine-forming cutting member.

10. Apparatus according to claim 9, wherein the debeaking assembly comprises a support element mounted to pivot relative to a support structure which is displaceable in rotation but whose axial position is fixed, said support element being actuated by said first actuator means, the debeaking element being actuated by said second actuator means so as to perform debeaking by axial displacement of the debeaking element relative to the support structure, the support element including a through orifice which, in the rest position of the cutting member, coincides with the orifice through the support element such that the bird'beak is inserted simultaneously into the orifice in the support element and into the orifice in the cutting member when the debeaking element is brought into proximity with the beak while the beak is in the waiting position, with the beak advantageously being cut by pulling the cutting member upwardly.

11. Apparatus according to claim 7, including means for adjusting the position of the debeaking element to a predetermined adjustable distance from the holding and restraining means in order to cut the beak at a predetermined distance from the nostril of the bird.

12. Apparatus according to claim 11, wherein the holding and restraining means comprise a front piece constituting at least a portion of a cap having a hollow for receiving at least a portion of the head of a bird, said hollow including an opening of just sufficient width to pass the beak of the bird so that at least a portion thereof is accessible from outside the front piece for debeaking purposes, said front piece being pivotally mounted relative to its support, preferably about a pivot axis which is disposed horizontally and is situated on the same side of the front piece that includes the beak-passing opening, but beyond the plane of the opening.

13. Apparatus according to claim 7, wherein at a plurality of the holding and restraining means are mounted to move around a closed circuit and are spaced apart along said closed circuit, the debeaking assembly being disposed near said closed circuit such that each holding and restraining means is caused to pass initially through a loading station, then through a debeaking station, and finally through an unloading station, with a support which is mobile relative to a support structure being mounted so as to move from a non-operative position to an operating position and vice versa, the debeaking assembly being at least partially linked to the mobile support so as to move therewith, the first actuator means including a first cam fixed to the moving support and first cam follower means linked to a support element for the debeaking element, and the second actuator means including a second cam fixed to the support structure of the mobile support and of the support element, and second cam follower means suitable for ensuring axial displacement of the debeaking element relative to the support structure.

14. Apparatus according to claim 12, wherein said front piece includes at least one inclined slope or ramp on its face facing the debeaking element and serving to accurately adjust the distance from the nostrils of the beak at which the beak is cut or perforated.

15. A method according to claim 1, further comprising the steps of cauterizing the beak at least once after debeaking.

16. In a method of automatically debeaking poultry, the method comprising:

providing a frame with holding and restraining means for holding and restraining the head of a bird substantially immobile and for treating the bird held in this way, in particular for debeaking purposes; and providing a debeaking assembly in the vicinity of said holding and restraining means, said debeaking assembly including a debeaking element which is displaceable between a non-operative position and an operative position so that the debeaking element is in a debeaking position against the beak;

the improvement which comprises performing debeaking in two stages:

a first stage of bringing the debeaking assembly including the debeaking element into proximity with the beak while the beak is in a waiting position;

a second stage of displacing the debeaking element relative to the debeaking assembly in order to perform debeaking;

the debeaking device including a guillotine-forming cutting member having an upper debeaking element and a lower debeaking element, said upper and lower debeaking elements coming into contact with the upper beak and the lower beak of the bird, respectively, before being moved in opposite directions to perform said debeaking.

17. In an apparatus for automatically debeaking poultry comprising:

a frame;

holding and restraining means for holding and restraining the head of a bird substantially immobile and for treating the held bird, particularly for debeaking purposes;

a debeaking assembly in the vicinity of the holding and restraining means, including a debeaking element which is displaceable between a non-operative position and an operative position so that the debeaking element is in a debeaking position against the beak; and actuator means for displacing the debeaking assembly into the operative position, and thereafter returning the debeaking assembly to the non-operative position;

the improvement which comprises the actuator means including first actuator means for bringing the debeaking assembly including the debeaking element into proximity with the beak while the beak is in a waiting position, and second actuator means for displacing the debeaking element relative to the debeaking assembly in order to perform debeaking;

said debeaking element including a perforating member for perforating the beak over a nerve in the beak in order to destroy the nerve.

18. The apparats of claim 17, wherein said perforating member comprises a drill bit system.

19. The apparatus of claim 17, wherein said perforating member comprises a laser system.

20. The apparatus of claim 17, wherein said perforating member comprises an electric arc system.

* * * * *